United States Patent [19]

Bondioli

[11] Patent Number: 4,890,948

[45] Date of Patent: Jan. 2, 1990

[54] ACCIDENT PREVENTIVE MODULAR DEVICE FOR HOMOKINETIC, WIDE-ANGLE JOINTS INTENDED FOR USE IN AGRICULTURE OR OTHER

[76] Inventor: Edi Bondioli, Via Gina Bianchi 18, 46029 Suzzara, Mantova, Italy

[21] Appl. No.: 98,758

[22] Filed: Sep. 17, 1987

Related U.S. Application Data

[63] Continuation of Ser. No. 876,235, Jun. 19, 1986, abandoned.

[30] Foreign Application Priority Data

Jun. 20, 1985 [IT] Italy ................... 9442A/85

[51] Int. Cl.[4] .................... F16B 11/00; F16B 3/00
[52] U.S. Cl. ....................... 403/23; 403/58; 464/171
[58] Field of Search ............... 403/23, 26, 50, 51, 403/57, 58, 134, 164, 165; 464/171–173, 117, 118, 175; 384/275

[56] References Cited

U.S. PATENT DOCUMENTS

| 1,410,791 | 3/1922 | Banks | 464/171 X |
| 1,816,891 | 8/1931 | Boyden | 464/171 |
| 1,968,925 | 8/1934 | Barish | 464/173 X |
| 2,425,809 | 8/1947 | Johnson | 464/173 X |
| 2,929,232 | 3/1960 | Muller | 464/171 |
| 2,981,084 | 4/1961 | Glover | 464/171 |
| 3,053,062 | 9/1962 | Geisthoff | 464/172 |
| 3,136,140 | 6/1964 | Atkinson | 464/172 |
| 3,551,013 | 12/1970 | Trojanowski | 464/172 |
| 3,906,747 | 9/1975 | Orain | 464/175 X |
| 4,107,952 | 8/1978 | Geisthoff | 464/175 |
| 4,262,498 | 4/1981 | Krude et al. | 464/175 X |
| 4,385,677 | 5/1983 | Sowers | 464/171 |
| 4,501,573 | 2/1985 | Bondioli | 464/172 |
| 4,610,559 | 9/1986 | Mayhew et al. | 464/171 X |

FOREIGN PATENT DOCUMENTS

| 3033850 | 3/1982 | Fed. Rep. of Germany . |
| 2060531 | 6/1971 | France . |
| 1585044 | 2/1981 | United Kingdom . |

Primary Examiner—Randolph A. Reese
Assistant Examiner—Peter M. Cuomo
Attorney, Agent, or Firm—Mc Glew & Tuttle

[57] ABSTRACT

The accident prevention guard is intended for homokinetic—as well as wide-angle—joints which have an end fork, an inner fork and a central body. The guard is made up of a shell structure for the protection of the central body, held through two annular supports by the central body and able to freely rotate with respect thereto. It is completed with an end cone for the shaft guard, suitable for completing the overlap on the side of the inner fork. The shell structure is made up of two parts, matched to each other along a plane transverse to the axis of the central body; each of the parts is made to rest on and engage with the body of the homokinetic wide-angle joint so as to maintain—as sole freedom degree—the rotation about the axis of the same body.

3 Claims, 4 Drawing Sheets

Fig. 4
Fig. 5
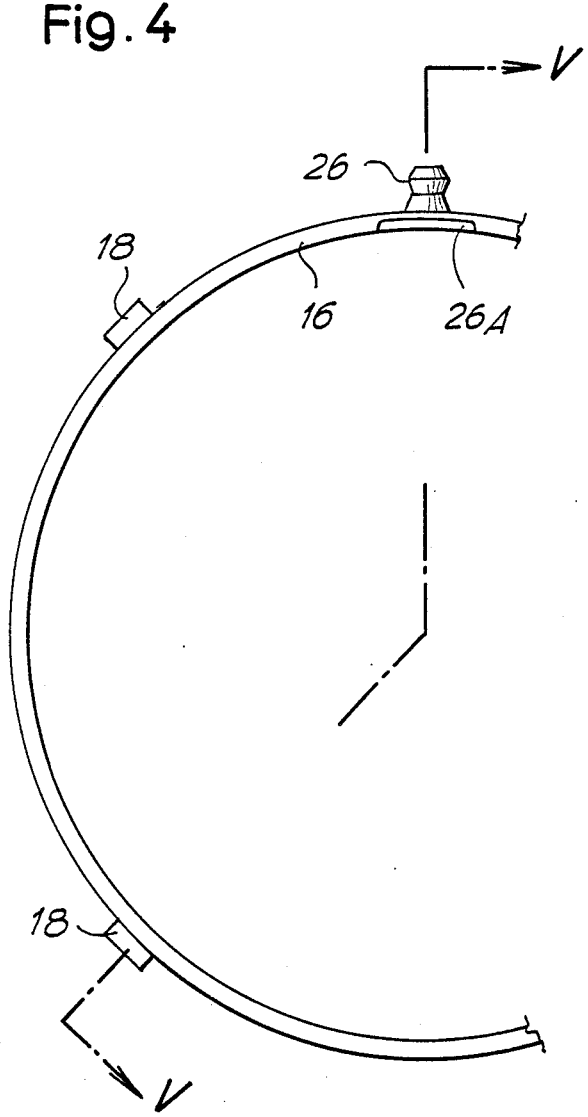
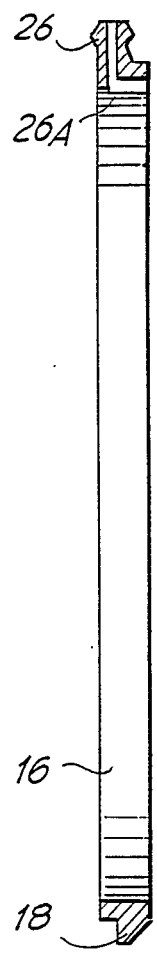

ACCIDENT PREVENTIVE MODULAR DEVICE FOR HOMOKINETIC, WIDE-ANGLE JOINTS INTENDED FOR USE IN AGRICULTURE OR OTHER

This application is a continuation, of application Ser. No. 876,235, filed June 19, 1986 now abanonded.

FIELD AND BACKGROUND OF THE INVENTION

In agriculture, and also in other application fields, it is of advantage in several situations to replace—on the Cardan shafts for horsepower transmission—the normal Cardan joint with a homokinetic, wide-angle joint.

As far as the present invention is concerned, the difference between the two mechanisms is to be found in the different number of articulations and in the diverse dimensions. In the simple Cardan joint, two mechanical elements are connected to each other by a cross journal articulation and their axes can thereby take up different relative angular positions with continuity. In the homokinetic, that is constant-velocity universal joint, these same elements are connected with a third intermediate member to which each of the elements is articulated by the relevant cross journal. According to the current nomenclature, the constant-velocity universal joint comprises: an end fork constituting the first mechanical element predisposed for the assembly on a power take-off shaft of a tractor or operating machine; an inner fork constituting the second mechanical element connected to the telescopic part of the Cardan shaft; a central body constituting the third intermediate member of said constant-velocity universal joint.

Because of the central body, the constant-velocity universal joint takes up—if compared with the simple joint—a considerably greater axial dimension. The possibility of realizing angular relative positions between the axis of the outer fork and the one of the inner fork is also greatly increased; in the most technically advanced models, these angles reach a value of at least 80°.

As a consequence of the above mentioned situation, the construction of an accident prevention guard to be mounted on the Cardan shaft, exhibits some problems. In the case of the simple joint, the guard must completely cover the joint up to the end of the tube fork. In the case of a constant-velocity universal joint, the guard must also cover the whole length of the central body.

According to a known technique, the guard of the constant-velocity universal joint is obtained by integrating the shaft guard with simple-joints through end extension cones which are suitably prolonged and widened. Such solution, however, exhibits some drawbacks, among which: the fact that, for a certain value of the articulation angle of the constant-velocity universal joint, an interference takes place between the intermediate body and the guard cone, since it is impossible—for obvious reasons of overall dimensions—to increase at will the dimensions of the latter; the fact that with the increasing of the articulation angle, greater and greater portion of the central body projects from the end cone, which portion therefore, results unprotected.

SUMMARY AND OBJECT OF THE INVENTION

It is an object of the invention to provide an accident prevention guard for a constant-velocity, wide-angle universal joint with an end fork, an inner fork and a central body, which guard is made up of a shell structure for the protection of the central body, held by said central body and able to freely rotate relative thereto, and with an end cone of the shaft guard, apt to complete the overlap of the inner fork side.

Practically and advantageously, the shell structure is made up of two parts being matched to each other along a plane transverse to the axis of the central body; and each of the parts is made to rest on and engage with the body of the constant-velocity universal joint so as to maintain—as a sole freedom degree—the rotation about the axis of the same body. The engagement of the shell structure with the central body may be achieved through two rings that are secured to the shell structure and are housed into tool-machined seats provided at the ends of the body, these rings acting as sliding-friction bearings; the seats have cylindrical surfaces for the radial support, and axial shoulder surfaces for the axial centering of the shell structure. On the rings, which are exactly alike, a greaser for the lubrication may be integrally formed thereto, as well as tongues for the engagement of rings with the half-shells.

The two parts of the shell structure may be formed by two substantially alike half-shells.

The two half-shells may be matched to each other by metal bolts housed and hidden in suitable seats, the conformation of the seats2 being such as to consent the handling of the bolts through a simple screw-driver. The two half-shells are advantageously revolution developed, substantially with approximately truncated cone lengths, with compact dimensions, lacking in grips that may constitute a potential source of risk and such as to completely cover the central body of the constant-velocity universal joint; an eyelet for the hooking of the retaining element (chain) is provided integral with the guard and included in the rotation space; moreover, apertures may be provided in the half-shells to allow for a free passage into the various lubricating points of the constant-velocity, universal joint and of the support rings.

In accordance with the above, in the guard according to the invention, the whole overlap is achieved through two independent modules: a shell provided for the covering of the central body; and an end cone, being combined with the guard of the shaft, having suitable shape and elasticity, which covers the inner fork and also overhangs—to some extent—the above mentioned shell. The protecting shell of the central body rests and is directly guided on the same body and strictly follows all the body's movements with the exception of the rotation about the axis. In this way, the constant-velocity universal joint body is autonomously and completely protected all the time, whatever the position and the work angle of the transmission may be, independently from the guard mounted on the adjacent components of the Cardan transmission or from the fixed guard mounted in correspondence to the power take-off point.

The various features of novelty which characterize the invention are pointed out with particularity in the claims annexed to and forming a part of this disclosure. For a better understanding of the invention, its operating advantages and spcific objects obtained by its uses, reference is made to the accompanying drawings and descriptive matter in which preferred embodiments of the invention are illustrated.

BRIEF DESCRIPTION OF THE DRAWINGS

In the drawings

FIGS. 4 and 5 show enlarged details.

Figure 1:
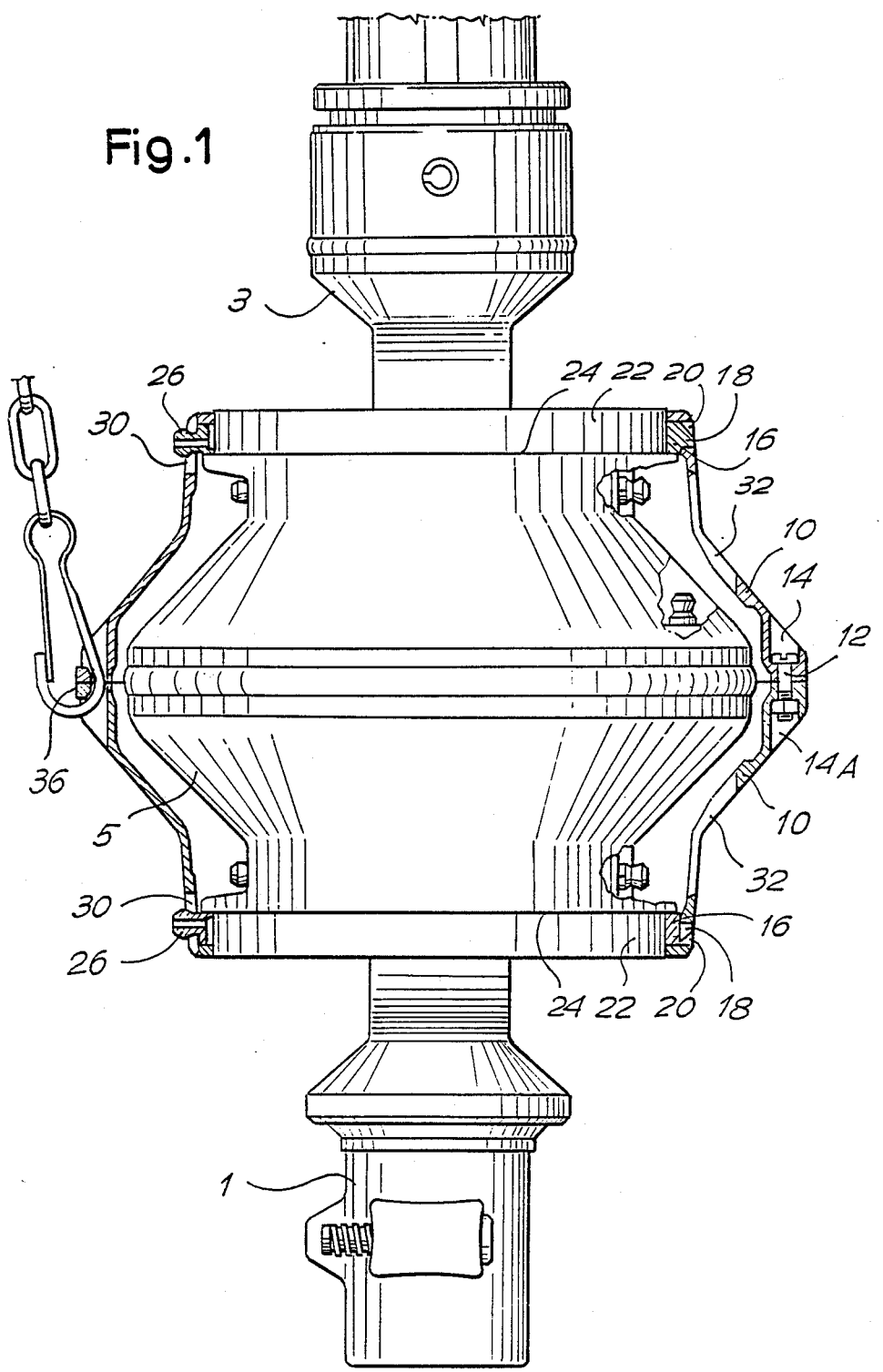
FIG. 1 shows a sectional view of the shell structure mounted on the central body.
Figure 2:
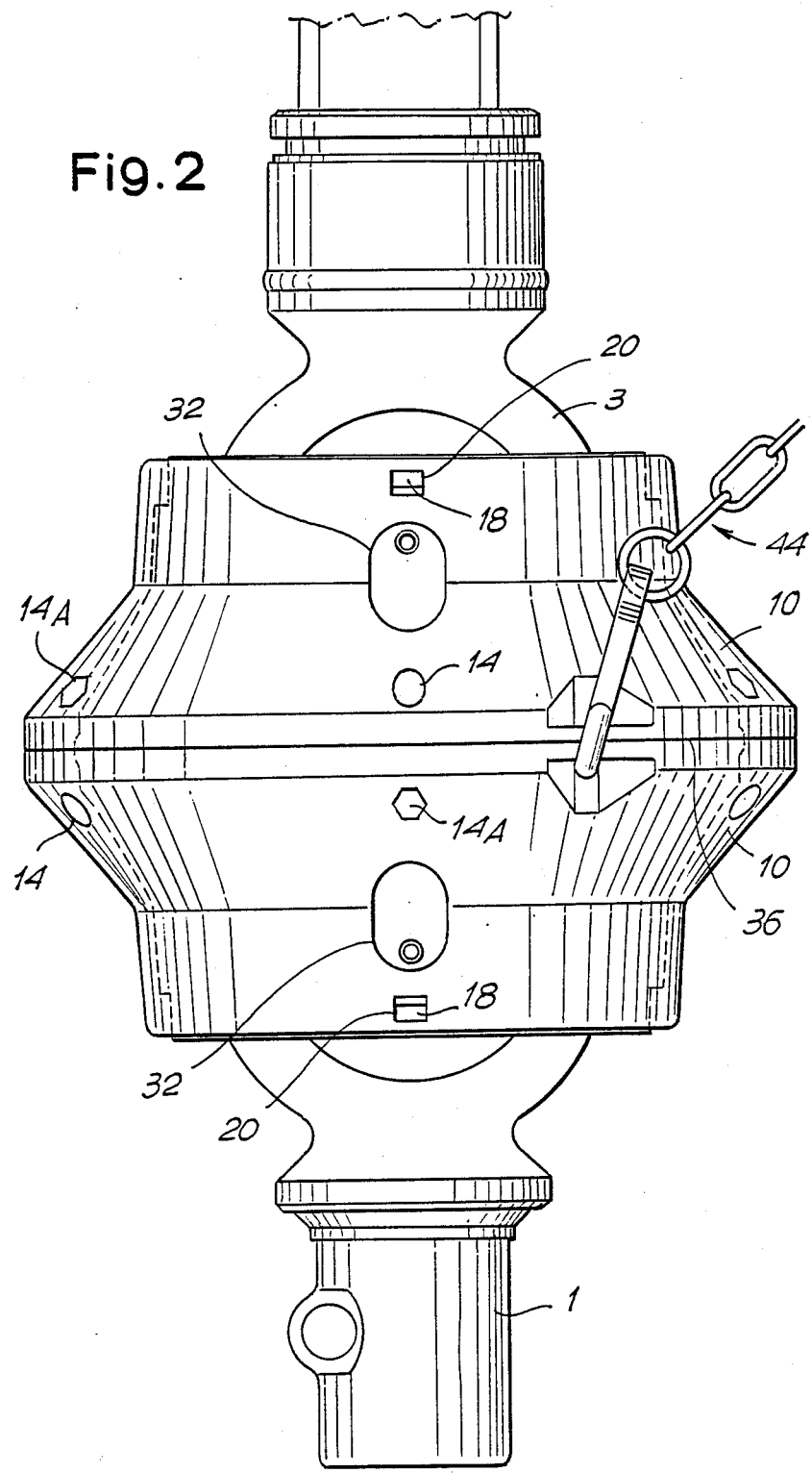
FIG. 2 shows an external view of the same shell structure.

In drawing, numerals 1 and 3 indicate two forks, an inner fork 3 and an end fork 1 which are connected together to form a universal joint and are positioned adjacent to central body 5.

A total protection guard for the universal joint is obtained by the asssembly of two alike half-shells 10 which are united by metal bolts 12 housed into suitably shaped seats 14 which prevent the bolts from entering into contact with possible interfering foreign matter. The handling of the bolts 12 can be accomplished by using a simple screw-driver since the cylindrical screw head is provided with a notch, and the seat 14A of the nut has a hexagonal contour which prevents the rotation of the nut housed therein.

The engagement of the guard with the central body 5 is achieved through two rings 16 of plastic material, which are rigidly connected to the half-shells 10 by two shaped tongues 18 housed into slots 20, and which radially and axially rest on surfaces 22, 24 tool-machined in the same body 5. The two rings 16, mounted beforehand in the relevant half-shells 10, prevent—after the tightening of the bolts 12—any radial and axial displacement because of the contacts with the surfaces 22 and 24, but allow, at the same time, the relative free rotation between the guard formed by the half-shells 10 and the metal central body 5 of the constant-velocity universal joint; the rings, therefore, have the function of sliding friction bearings. On their outer surface, a greaser 26 is integrally formed (or applied) which is accessible from the outside, and is intended to feed the lubricant into the corresponding inner chamber 26A from which the lubricant branches off on the sliding surfaces 22 and 24 and on the corresponding surfaces of the relevant ring.

The two half-shells 10 have a shape which follows the shaping of the central body 5 of the constant-velocity universal joint, in order to keep the radial overall dimensions at the minimum value compatible with the structural requirements and with the dimension and form tolerances of the same body.

The half-shells 10, in addition to the shaped slots 20 in which the tongues 18 of the rings 16 are engaged, have a hole 30 through which it is possible to reach the greaser 26, and a slot 32 for the access to the greasers predisposed on the constant-velocity universal joint (the cross journal greasers and the central chamber greaser).

In correspondence of the edges of the joining surface of the half-shells, an eyelet 36 is provided for the hooking of the guard retaining element. On this same surface, the seats 14, 14A of the assembly bolts 12 are provided, which result in a shielded construction, that is hidden, likewise the eyelet 36 which is shielded or hidden in respect to the rotation outline.

Figure 3:
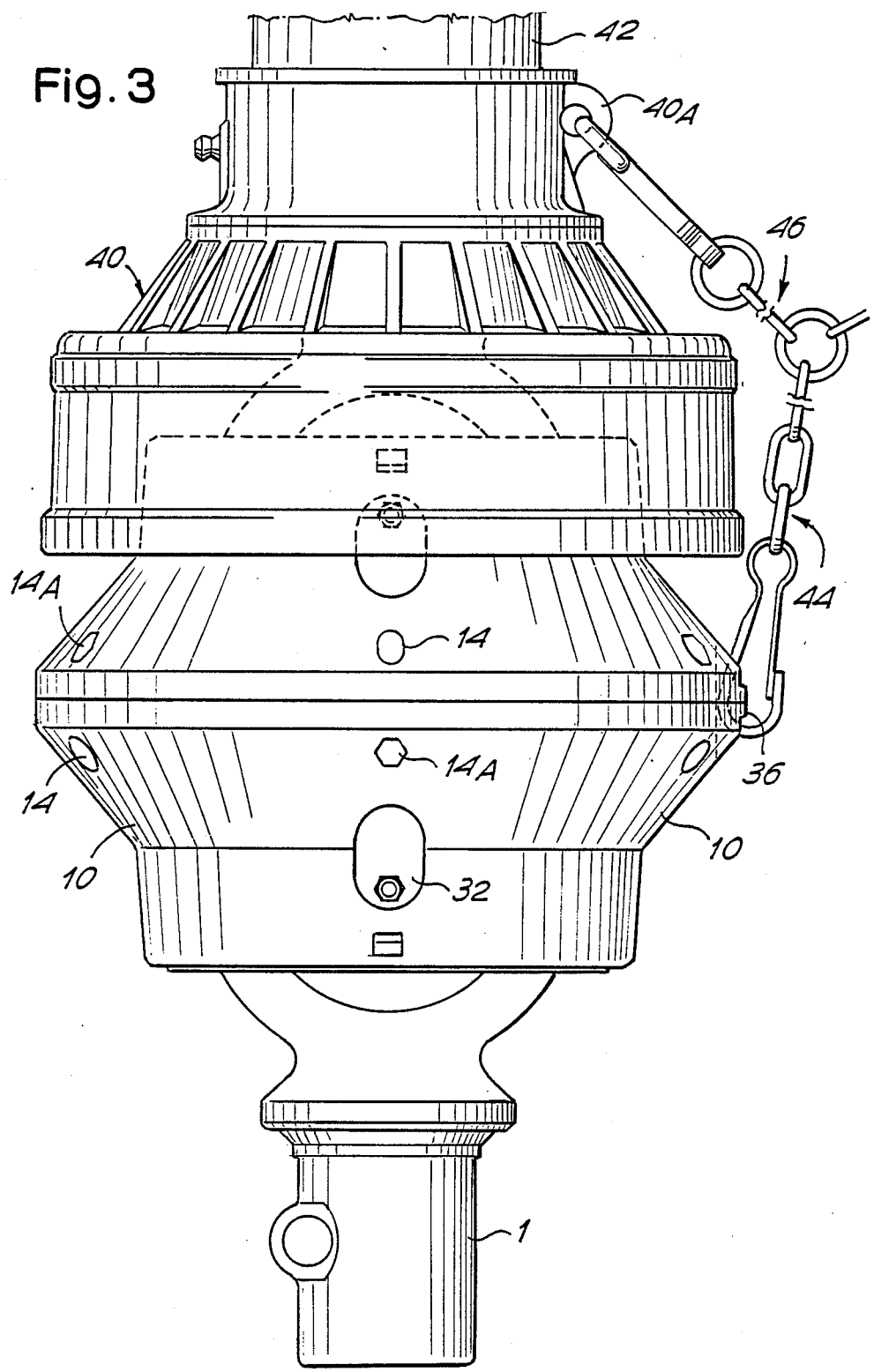
FIG. 3 is similar to FIG. 2, but shows the guard completed by a cone mounted on the guard of an adjacent shaft of the transmission.

The second module of the guard is made up (FIG. 3) of a normal end cone 40, formed integral with the guard 42 of the shaft adjacent to the joint. A further protection is provided for the fork 1, applied to the support of the power take-off or other usual connection. The cone 40 is also provided with an eyelet 40A for the hooking of a retaining element. The two modules are kept in stable position by suitable chains 44 and 46 which are engaged through spring-catches with the eyelets 36 and 40A.

While specific embodiments of the invention have been shown and described in detail to illustrate the application of the principles of the invention, it will be understood that the invention may be embodied otherwise without departing from such principles.

I claim:

1. In a wide-angle, constant-velocity, universal joint comprising an end fork, an inner fork, and a central body extending between the end fork and the inner fork, said central body having a pair of opposite ends spaced apart along a rotational driving axis of the joint pivotally connected respectively to said end fork and said inner fork and surrounding a portion of each of said end fork and said inner fork thereby interconnecting said inner fork and said end fork and rotating with said inner fork and said end fork; said central body having a pair of annular seats thereon which defines bearing tracks at the respective opposite ends; an accident prevention guard comprising a bipartite shell including first and second substantially identical parts having opposite ends, one end being smaller than the other end and having annular side walls extending in divergent manner from the respective one ends to the respective other ends and having radially extending flanges at respective other ends and bolt receiving recesses defined in said radially extended flanges, first and second mounting ring portions defining circumferentially extending bearing surfaces, complementary attachment means on the respective one ends of the shell parts and the respective ring portions which attachment means are interengaged to attach the shell parts to the ring portions; bolt means extending through said first and second radially extending end flanges and concealed within said recesses holding said shell parts together with the first and second radially extending end flanges in opposed relation and the bearing surfaces of the ring portions in circumferential sliding engagement with the bearing tracks of the respective annular seats of the central body and thereby to completely supporting the shell parts on the central body, the first and second shell of the bipartite shell parts cooperating to completely cover a substantial portion the central body; and, means for preventing rotation of said shell upon rotation of said central body.

2. A constant-velocity universal joint according to claim 1 wherein said complementary attachment means comprise radially projecting tongues on said ring portions and slots formed in said half shells into which said tongues project.

3. A constant-velocity universal joint according to claim 1 wherein the ring portions define greasing chambers open to the bearing surfaces, grease nipples extending from respective chambers and a greaser access slot formed in each of said half shells through which slot the respective nipples extend.

* * * * *